United States Patent [19]

Takagishi et al.

[11] 4,336,835
[45] Jun. 29, 1982

[54] PRODUCTION OF WET-STRENGTH PAPER WITH AQUEOUS SOLUTIONS OF CATIONIC THERMOSETTING RESINS

[75] Inventors: Hisao Takagishi, Kyoto; Norio Kondo, Minoo, both of Japan

[73] Assignee: Sumitomo Chemical Company, Limited, Osaka, Japan

[21] Appl. No.: 253,919

[22] Filed: Apr. 14, 1981

Related U.S. Application Data

[62] Division of Ser. No. 78,713, Sep. 25, 1979, Pat. No. 4,287,110.

[51] Int. Cl.$^3$ .............................................. D21H 3/58
[52] U.S. Cl. .................................. 162/164.3; 427/326; 427/386; 427/391; 428/479.6
[58] Field of Search ............... 528/341; 260/29.2 EP, 260/29.2 N; 162/164.3; 427/326

[56] References Cited

U.S. PATENT DOCUMENTS

| | | | |
|---|---|---|---|
| 2,926,154 | 2/1960 | Keim | 260/29.2 |
| 2,961,347 | 11/1960 | Floyd | 260/29.2 EP |
| 3,197,427 | 7/1965 | Schmalz | 260/29.2 EP |
| 3,332,901 | 7/1967 | Keim | 528/341 |
| 3,989,659 | 11/1976 | Aldrich et al. | 260/29.2 EP |

Primary Examiner—Theodore E. Pertilla
Attorney, Agent, or Firm—Stevens, Davis, Miller & Mosher

[57] ABSTRACT

A durable aqueous solution of a thermosetting resin having a relatively high solid content which imparts a high degree of wet strength to paper, is produced by the reaction of an aliphatic dicarboxylic acid with a polyalkylenepolyamine to form a polyamidopolyamine, which is successively subjected to reaction with epichlorohydrin, the first reaction being carried out using a molar ratio of aliphatic dicarboxylic acid to polyalkylenepolyamine of 1:1.0 to 1.2 and continued until the viscosity at 25° C. of 50% aqueous solution of resulting polyamidopolyamine reaches 400 to 1,000 cps, and the second reaction being carried out using epichlorohydrin in an amount of 1.6 to 1.7 moles per mole of the polyamide secondary amine and continued until the viscosity at 25° C. of 15% aqueous solution of the resulting product reaches 30 to 150 cps.

16 Claims, No Drawings

PRODUCTION OF WET-STRENGTH PAPER WITH AQUEOUS SOLUTIONS OF CATIONIC THERMOSETTING RESINS

This is a division of application Ser. No. 78,713 filed Sept. 25, 1979, now U.S. Pat. No. 4,287,110 patented Sept. 1, 1981.

The present invention relates to a process for producing aqueous solutions of cationic thermosetting resins which impart a high degree of wet-strength to paper and have a high solid content and high stability.

As stated in U.S. Pat. No. 2,926,154, it is well known that polyamidopolyamine/epichlorohydrin resins are useful as resins to impart a high degree of wet strength to paper. The polyamidopolyamine/epichlorohydrin resins specifically disclosed in said U.S. Patent are obtained as aqueous solutions of 10 to 30% concentration. In general, the degree of wet strength is increased with increasing the viscosity of said aqueous solution. When the obtained aqueous solution has an increased viscosity, the viscosity further rises with the lapse of time to form a gel. Consequently, the fact is that a commercially available product of this type is an aqueous solution of as low concentration as about 10% in order to decrease apparent viscosity. This leads to commercially great disadvantages in terms of an increase in the bulk of the product and transportation thereof.

For the reasons as described above, the inventors extensively studied a process for producing aqueous solutions of polyamidopolyamine/epichlorohydrin resins which are not only excellent in wet-strength effect on paper but are also high in solid content and moreover so stable that no gelation occurs over a long period of time. As a result, it was found that the desired aqueous solution of wet-strength resin can be obtained when the proportion of amounts of materials and the viscosity of an intermediate (polyamidopolyamine) and the final reaction product are controlled to particular ranges.

The present invention provides a process for producing an aqueous solution of a thermosetting resin, which consisting essentially of (i) heating an aliphatic dicarboxylic acid and a polyalkylenepolyamine to obtain a polyamidopolyamine, the molar ratio of the aliphatic dicarboxylic acid to the polyalkylenepolyamine being 1:1.0 to 1.2, and the heating being continued until the viscosity at 25° C. of a 50% aqueous solution of the resulting polyamidopolyamine reaches 400 to 1,000 cps, (ii) reacting the polyamidopolyamine with epichlorohydrin in an aqueous medium, the amount of epichlorohydrin being 1.6 to 1.7 moles per mole of the secondary amino group present in the polyamidopolyamine, the concentration of said reactants in the aqueous medium being 15 to 50% by weight, and the reaction being continued until the viscosity at 25° C. of a 15% aqueous solution of the reaction product reaches 30 to 150 cps, (iii) controlling the concentration of the aqueous reaction product solution to 15 to 30% by weight and (iv) adjusting the aqueous solution to pH 3 to 5 at 25° C. The invention also provides the aqueous solution produced by the process described above, and provides a process for producing wet-strength paper comprising applying the aqueous solution as defined above, and wet-strength paper produced thereby.

The present invention will be explained in detail.

Suitable aliphatic dicarboxylic acids usable in the present invention include, for example, malonic acid, succinic acid, glutaric acid, adipic acid and sebacic acid. Of these, adipic acid is particularly preferred from the industrial point of view. Polyalkylenepolyamines usable in the present invention include, for example, diethylenetriamine, triethylenetetramine, tetraethylenepentamine and iminobispropylamine. As to the molar ratio of aliphatic dicarboxylic acid to polyalkylenepolyamine, the stability of the final product (aqueous solution) tends to be decreased with decreasing the amount of the polyalkylenepolyamine because a polyamidopolyamine having a crosslinked structure is produced, while the polymerization degree of polyamidopolyamine tends to become difficult to increase with increasing the amount of polyalkylenepolyamine. Also, the wet strength improving effect of the final product on paper becomes large with increasing the polymerization degree of produced polyamidopolyamine, which, however, results in lowering the stability of the final product itself. For this reason, the molar ratio of aliphatic dicarboxylic acid to polyalkylenepolyamine is 1:1.0 to 1.2.

In this reaction, there is preferably added a sulfonic acid which acts as a reaction accelerating catalyst, because the time required for the polyamidopolyamine solution to reach a definite viscosity can be shortened by about 40% as compared with the case of using no sulfonic acid. Further, the stability of the final product becomes rather good. Preferred sulfonic acids include sulfuric acid, benzenesulfonic acid and p-toluenesulfonic acid. The amount of the acids used is within a range of 0.005 to 0.10 mole, preferably 0.01 to 0.05 mole, per mole of polyalkylenepolyamine. When the amount is less than 0.005 mole, the reaction accelerating effect is low, while when the amount exceeds 0.10 mole, the stability of the final product with the lapse of time deteriorates so that gelation occurs in a few days during storage at 50° C. It is a surprising fact that said sulfonic acid can exhibit an accelerating effect for this reaction with rather good affect on the stability of the final product, unlike other acids such as phosphoric acids, which are known, in general, as a catalyst for this type of reaction.

From the viewpoints of the performances and stability of the final product, it is also necessary to continue the reaction until the viscosity at 25° C. of a 50% aqueous solution of the produced polyamidopolyamine reaches 400 to 1,000 cps. When the viscosity is less than 400 cps, the wet strength improving effect of the final product is not developed sufficiently, while when the viscosity exceeds 1,000 cps, the stability of the product deteriorates so that gelation occurs.

The reaction between aliphatic dicarboxylic acid and polyalkylenepolyamine is carried out at a temperature of 100° to 250° C., preferably 130° to 200° C.

When said viscosity has reached 400 to 1,000 cps, water is added to the reaction system to lower the temperature and discontinue the reaction, whereby the polyamidopolyamine having secondary amino groups is obtained in the form of an aqueous solution.

The aqueous polyamidopolyamine solution thus obtained is then reacted with epichlorohydrin at a temperature of about 30° to about 80° C. in an aqueous medium. The amounts of reactants in this reaction are such that the molar ratio of secondary amino groups in the polyamidopolyamine to epichlorohydrin is 1:1.6 to 1.7. When the ratio of epichlorohydrin is less than 1.6, the stability of the final product with the lapse of time deteriorates so that gelation occurs within a few days during storage at 50° C. On the other hand when the ratio exceeds 1.7, a desired wet strength can not be obtained, and besides unreacted epichlorohydrin increases to generate unpleasant odor.

In this reaction between polyamidopolyamine and epichlorohydrin, the concentration of said reactants in an aqueous medium is 15 to 50% by weight, preferably 15 to 40% by weight. The reaction is continued until the viscosity of a 15% aqueous solution of the reaction product reaches 30 to 150 cps at 25° C. When the viscosity at that time is lower than 30 cps, the wet strength is not sufficient, while when the viscosity exceeds 150 cps, the final product deteriorates in stability, and when put into practice, that is, added to pulp slurry on sheet-forming, it causes violent foaming which not only makes the sheet-forming operation difficult but also damages formation.

When the reaction solution reaches the desired viscosity, its solid content is adjusted to 15 to 30% by diluting with water if necessary, and then in order to stop the reaction, the pH is adjusted to 3 to 5 with addition of an acid such as hydrochloric acid, sulfuric acid, phosphoric acid, formic acid or acetic acid.

The aqueous solutions of cationic thermosetting resins obtained according to the present invention are outstandingly superior in the following points to the polyamidopolyamine/epichlorohydrin resins produced by conventional methods: The wet strength improving effect of the present resins is equal to or superior to that of conventional ones; and the concentration of the conventional resins in the aqueous solution should be decreased to as low as about 10% in order to make stable commercial products of the solution, while the concentration of the present resins can be increased to as high as 15 to 30%, and besides the stability of the products is excellent.

Further, the aqueous resin solutions obtained according to the present invention are used not only as wet-strength resins for paper but also as retention aids for fillers added on paper-making, drainage aids for improving paper-making rate and flocculants for removing fine particles from dirty water such as factory waste water.

The present invention will be illustrated in more detail with reference to the following examples, in which % is by weight unless otherwise specified.

EXAMPLE 1

To a 500-ml four-necked flask equipped with a thermometer, reflux condenser and stirrer were added diethylenetriamine (103 g, 1.0 mole), water (10 g) and adipic acid (146 g, 1.0 mole). The temperature of the mixture was raised with water being distilled out, and reaction was carried out at 155° to 160° C. for 16 hours. Thereafter, water (210 g) was gradually added to obtain an aqueous polyamidopolyamine solution having a solid content of 50.1% and a viscosity of 680 cps (25° C.). This aqueous solution (129 g, 0.3 mole) and water (260 g) were placed in another flask, and epichlorohydrin (44.4 g, 0.48 mole) was added dropwise at 25° C. over 20 minutes. The resulting solution was heated to 60° C. and kept at the same temperature until its viscosity reached 245 cps (25° C.). At this point, water (225 g) was added and the pH was adjusted to 4.2 with hydrochloric acid. The product obtained had a solid content of 15.2% and a viscosity of 91 cps (25° C.). The product caused no gelation even after being stored at 50° C. for 30 days.

EXAMPLE 2

To the same reactor as used in Example 1 were added diethylenetriamine (103 g, 1.0 mole), water (10 g) and adipic acid (138.7 g, 0.95 mole). Reaction was carried out at 160° to 165° C. for 12 hours with water being distilled out. Thereafter, water (200 g) was gradually added to obtain an aqueous polyamidopolyamine solution having a solid content of 50.3% and a viscosity of 540 cps. The whole of the solution was placed in another flask and then diluted with water (600 g) and epichlorohydrin (148 g, 1.6 moles) was added dropwise at 30° C. over 15 minutes. The resulting solution was kept at 55° to 60° C. with stirring until its viscosity reached 270 cps (25° C.). At this point, water (125 g) was added and the pH was adjusted to 3.5 with hydrochloric acid. The product obtained had a solid content of 25.5% and a viscosity of 190 cps. The product caused no gelation even after being stored at 50° C. for 30 days, and when diluted to 15%, it had a viscosity of 56 cps (25° C.).

EXAMPLE 3

To the same reactor as used in Example 1 were added diethylenetriamine (103 g, 1 mole) water (10 g) and adipic acid (138.7 g, 0.95 mole). Reaction was carried out at 155° to 156° C. for 20 hours with water being distilled out. Thereafter, water (205 g) was added to obtain an aqueous polyamidopolyamine solution having a solid content of 50.1% and a viscosity of 510 cps. This 50% aqueous solution (125 g, 0.3 mole) and water (186 g) were placed in another flask, and epichlorohydrin (44.4 g, 0.48 mole) was then added. The resulting solution was kept at 60° C. with stirring until its viscosity reached 360 cps (25° C.). At this point, the pH was adjusted to 3.4 with hydrochloric acid. The product obtained had a solid content of 28.7% and a viscosity of 349 cps. The product causes no gelation even after being stored at 50° C. for 30 days, and when diluted to 15%, it had a viscosity of 75 cps (25° C.).

EXAMPLE 4

To the same reactor as used in Example 1 were added iminobispropylamine (131 g, 1 mole), water (10 g) and adipic acid (146 g, 1 mole). Reaction was carried out at 160° to 165° C. for 10 hours with water being distilled out. Thereafter, water (235 g) was added to obtain an aqueous polyamidopolyamine solution having a solid content of 50.2% and a viscosity of 780 cps. The whole of this solution and water (920 g) were placed in another flask, and epichlorohydrin (148 g, 1.6 moles) was then added. The resulting solution was kept at 60° C. with stirring, and when its viscosity reached 180 cps, it was adjusted to a pH of 3.5 with hydrochloric acid and then diluted to a solid content of 15% with water. The product obtained had a viscosity of 65 cps (25° C.) and caused no gelation even after being stored at 50° C. for 30 days.

EXAMPLE 5

To the same reactor as used in Example 1 were added diethylenetriamine (103 g, 1.0 mole), water (10 g), adipic acid (146 g, 1.0 mole) and 98% sulfuric acid (2 g, 0.02 mole). The temperature of the mixture was raised with water being distilled out, and reaction was carried out at 155° to 160° C. for 12 hours. Thereafter, water (210 g) was gradually added to obtain an aqueous polyamidopolyamine solution having a solid content of 50.3% and a viscosity of 690 cps (25° C.). This aqueous solution (129 g, 0.3 mole) and water (260 g) were placed in another flask, and epichlorohydrin (44.4 g, 0.48 mole) was added dropwise at 25° C. over 20 minutes. The resulting solution was heated to 60° C. and kept at the same temperature until its viscosity reached 245 cps (25° C.). At this point, water (225 g) was added and the pH was adjusted to 4.2 with hydrochloric acid. The product obtained had a solid content of 15.3% and a viscosity of 91 cps (25° C.). The product caused no gelation even after being stored at 50° C. for 30 days

EXAMPLE 6

To the same reactor as used in Example 1 were added diethylenetriamine (103 g, 1.0 mole), water (10 g), adipic acid (138.7 g, 0.95 mole) and p-toluenesulfonic acid (6.9 g, 0.04 mole). Reaction was carried out at 160° to 165° C. for 8 hours with water being distilled out. Thereafter, water (200 g) was gradually added to obtain an aqueous polyamidopolyamine solution having a solid content of 50.2% and a viscosity of 530 cps (25° C.). The whole of this solution was placed in another flask and then diluted with water (600 g), and epichlorohydrin (148 g, 1.6 moles) was added dropwise at 30° C. over 15 minutes. The resulting solution was kept at 55° to 60° C. with stirring until its viscosity reached 280 cps (25° C.). At this point, water (125 g) was added and the pH was adjusted to 3.5 with hydrochloric acid. The product obtained had a solid content of 25.6% and a viscosity of 193 cps (25° C.). The product caused no gelation even after being stored at 50° C. for 30 days, and when diluted to 15%, it had a viscosity of 57 cps (25° C.).

EXAMPLE 7

To the same reactor as used in Example 1 were added diethylenetriamine (103 g, 1 mole), water (19 g), adipic acid (138.7 g, 0.95 mole) and 98% sulfuric acid (3 g, 0.03 mole). Reaction was carried out at 155° to 156° C. for 13 hours with water being distilled out. Thereafter, water (205 g) was added to obtain an aqueous polyamidopolyamine solution having a solid content of 50.2% and a viscosity of 540 cps (25° C.). This 50% aqueous solution (125 g, 0.3 mole) and water (186 g) were placed in another flask, and epichlorohydrin (44.4 g, 0.48 mole) was then added. The resulting solution was kept at 60° C. with stirring, and when its viscosity reached 360 cps (25° C.), the pH was adjusted to 3.6 with hydrochloric acid. The product obtained had a solid content of 28.6% and a viscosity of 348 cps (25° C.). The product caused no gelation even after being stored at 50° C. for 30 days, and when diluted to 15%, it had a viscosity of 73 cps (25° C.).

EXAMPLE 8

To the same reactor as used in Example 1 were added iminobispropylamine (131 g, 1 mole), water (10 g), adipic acid (146 g, 1 mole) and p-toluenesulfonic acid (6.9 g, 0.04 mole). Reaction was carried out at 160° to 165° C. for 6.5 hours with water being distilled out. Thereafter, water (235 g) was added to obtain an aqueous polyamidopolyamine solution having a solid content of 50.1% and a viscosity of 770 cps (25° C.). The whole of this solution and water (920 g) were placed in another flask, and epichlorohydrin (148 g, 1.6 moles) was then added. The resulting solution was kept at 60° C. with stirring, and when its viscosity reached 180 cps, it was adjusted to a pH of 4.2 with hydrochloric acid and then diluted to a solid content of 15% with water. The product obtained had a viscosity of 66 cps (25° C.) and caused no gelation even after being stored at 50° C. for 30 days.

EXAMPLE 9

To the same reactor as used in Example 1 were added diethylenetriamine (103 g, 1 mole), water (10 g), adipic acid (138.7 g, 0.95 mole) and 98% sulfuric acid (8 g, 0.08 mole). Reaction was carried out at 155° to 156° C. for 11 hours with water being distilled out. Thereafter, water (210 g) was added to obtained an aqueous polyamidopolyamine solution having a solid content of 50.1% and a viscosity of 550 cps (25° C.). This 50% aqueous solution (126 g, 0.3 mole) and water (137 g) were placed in another flask, and epichlorohydrin (44.4 g, 0.48 mole) was then added. The resulting solution was kept at 60° C. with stirring, and when its viscosity reached 500 cps (25° C.), it was adjusted to a pH of 3.6 with hydrochloric acid and then diluted to a solid content of 30% with water. The product obtained had a viscosity of 320 cps (25° C.) and caused no gelation even after being stored at 50° C. for 30 days. When diluted to 15%, the product had a viscosity of 62 cps (25° C.).

COMPARATIVE EXAMPLE 1

The aqueous polyamidopolyamine solution (solid content 50.1%, viscosity 680 cps) (129 g, 0.3 mole) obtained in Example 1 and water (254 g) were placed in a four-necked flask, and epichlorohydrin (41.6 g, 0.45 mole) was added dropwise at 25° C. over 20 minutes. Thereafter, the resulting solution was kept at 55° C. with stirring until its viscosity reached 150 cps (25° C.). At this point, water (215 g) was added and the pH was adjusted to 3.6 with hydrochloric acid. The product obtained had a solid content of 15.1% and a viscosity of 56 cps (25° C.). The product caused gelation in two days on storage at 50° C.

COMPARATIVE EXAMPLE 2

Reaction was carried out in the same manner as in Example 1 except that at the step of modification with epichlorohydrin, the reaction was stopped when the viscosity of the reaction solution reached 40 cps. The reaction solution was adjusted to a pH of 4 with hydrochloric acid and then diluted with water to a solid content of 15%. The viscosity of the dilute solution was 17.5 cps.

COMPARATIVE EXAMPLE 3

To the same reactor as used in Example 1 were added diethylenetriamine (103 g, 1.0 mole), water (10 g) and adipic acid (146 g, 1.0 mole). Reaction was carried out at 150° to 153° C. for 4 hours with water being distilled out. Thereafter, water (205 g) was added to obtain an aqueous polyamidopolyamine solution having a solid content of 50.0% and a viscosity of 220 cps (25° C.). The whole of this solution, water for dilution (850 g) and epichlorohydrin (148 g, 1.6 moles) were added to a separable flask. The resulting solution was kept at 65° C. with stirring, and when its viscosity reached 250 cps (25° C.), it was adjusted to a pH of 4.5 with hydrochloric acid and then diluted with water to a solid content of 15%. The viscosity of the dilute solution was 92 cps (25° C.).

COMPARATIVE EXAMPLE 4

The aqueous polyamidopolyamine solution (125 g, 0.3 mole) obtained in Example 3, water (275 g) and epichlorohydrin (50 g, 0.54 mole) were mixed and kept at 65° C. with stirring. When the viscosity of the reaction solution reached 180 cps (25° C.), the solution was adjusted to a pH of 4.5 with hydrochloric acid and then diluted with water to a solid content of 15%. The viscosity of the dilute solution was 67 cps.

COMPARATIVE EXAMPLE 5

To the same reactor as used in Example 1 were added diethylenetriamine (103 g, 1 mole), water (10 g), adipic acid (138.7 g, 0.95 mole) and 98% sulfuric acid (15 g, 0.15 mole). Reaction was carried out at 155° to 156° C. for 10 hours with water being distilled out. Thereafter, water (215 g) was added to obtain an aqueous polyamidopolyamine solution having a solid content of 50.2% and a viscosity of 560 cps (25° C.). This 50% aqueous solution (129 g, 0.3 mole) and water (138 g) were added to a separable flask, and epichlorohydrin (44.4 g, 0.48 mole) was then added. The resulting solution was kept at 60° C. with stirring, and when its viscosity reached 490 cps (25° C.), it was adjusted to a pH of 3.4 with hydrochloric acid and then diluted with water to a solid content of 25%. The viscosity of the dilute solution was 195 cps (25° C.). This solution caused gelation in three days on storage at 25° C., and when diluted to 15%, it had a viscosity of 64 cps (25° C.).

COMPARATIVE EXAMPLE 6

The aqueous polyamidopolyamine solution (solid content 50.3%, viscosity 690 cps at 25° C.) (129 g, 0.3 mole) obtained in Example 5 and water (254 g) were added to a four-necked flask, and epichlorohydrin (41.6 g, 0.45 mole) was added dropwise at 25° C. over 20 minutes. The resulting solution was kept at 55° C. with stirring until its viscosity reached 185 cps (25° C.). At this point, water (215 g) was added and the pH was adjusted to 3.6 with hydrochloric acid. The product obtained had a solid content of 15.1% and a viscosity of 68 cps (25° C.). The product caused gelation in two days on storage at 50° C.

COMPARATIVE EXAMPLE 7

Reaction was carried out in the same manner as in Example 5 except that at the step of modification with epichlorohydrin, the reaction was stopped when the viscosity of the reaction solution reached 45 cps. The reaction solution was adjusted to a pH of 4 with hydrochloric acid and the diluted with water to a solid content of 15%. The viscosity of the dilute solution was 17.8 cps.

COMPARATIVE EXAMPLE 8

To the same reactor as used in Example 1 were added diethylenetriamine (103 g, 1.0 mole), water (10 g), adipic acid (146 g, 1.0 mole) and 98% sulfuric acid (2 g, 0.02 mole). Reaction was carried out at 150° to 153° C. for 3 hours with water being distilled out. Thereafter, water (205 g) was added to obtain an aqueous polyamidopolyamine solution having a solid content of 50.2% and a viscosity of 230 cps (25° C.). The whole of this solution was placed in another flask, and water for dilution (850 g) and epichlorohydrin (148 g, 1.6 moles) were then added. The resulting solution was kept at 65° C. with stirring, and when its viscosity reached 250 cps (25° C.), it was adjusted to a pH of 4.5 with hydrochloric acid and then diluted with water to a solid content of 15%. The viscosity of the dilute solution was 92 cps (25° C.).

COMPARATIVE EXAMPLE 9

The aqueous polyamidopolyamine solution (125 g, 0.3 mole) obtained in Example 7, water (200 g) and epichlorohydrin (50 g, 0.54 mole) were mixed and kept at 65° C. with stirring. When the viscosity of the reaction solution reached 370 cps (25° C.), the pH of the solution was adjusted to 3.6 with hydrochloric acid. The product obtained had a solid content of 28.5% and a viscosity of 354 cps (25° C.). When the product was diluted to 15% with water, it had a viscosity of 74 cps (25° C.).

REFERENCE EXAMPLE 1

Using the aqueous resin solutions obtained in Examples 1 to 9 and Comparative Examples 1 to 9, a sheet-forming test was carried out according to the TAPPI standard sheet-forming method, and the performances of the resulting paper were measured.

| Sheet-forming conditions; | |
|---|---|
| Test pulp: | NBKP/LBKP (1:1) mixture |
| Beating degree: | 435 cc (Canadian standard freeness) |
| Amount of resin: | 0.8% (based on pulp) |
| Heat treatment: | 110° C. × 10 min |
| Average basis weight: | 80 g/m$^2$ |

The results are shown in Table 1.

TABLE 1

| | Test items | | |
|---|---|---|---|
| Sample | Dry breaking length (km) | Wet breaking length (km) | Stability* |
| No resin | 7.86 | 0.21 | No gelation |
| Example 1 | 9.50 | 1.55 | " |
| Example 2 | 9.45 | 1.50 | " |
| Example 3 | 9.48 | 1.53 | " |
| Example 4 | 9.47 | 1.51 | " |
| Example 5 | 9.51 | 1.56 | " |
| Example 6 | 9.47 | 1.52 | " |
| Example 7 | 9.48 | 1.53 | " |
| Example 8 | 9.48 | 1.52 | " |
| Example 9 | 9.48 | 1.54 | " |
| Comparative Example 1 | 9.48 | 1.50 | Gelation after two days |
| Comparative Example 2 | 9.40 | 1.42 | No gelation |
| Comparative Example 3 | 9.38 | 1.40 | " |
| Comparative Example 4 | 9.35 | 1.38 | " |
| Comparative Example 5 | 9.49 | 1.52 | Gelation after three days |
| Comparative Example 6 | 9.50 | 1.51 | Gelation after two days |
| Comparative Example 7 | 9.40 | 1.42 | No gelation |
| Comparative Example 8 | 9.38 | 1.40 | " |
| Comparative Example 9 | 9.35 | 1.38 | " |

*Stability: Stored at 50° for 30 days.

What is claimed is:

1. A process for producing wet-strength paper, which comprises applying to paper an aqueous solution of a thermosetting resin produced by a process consisting essentially of (i) heating an aliphatic dicarboxylic acid and a polyalkylenepolyamine to obtain a polyamidopolyamine, the molar ratio of the aliphatic dicarboxylic acid to the polyalkylenepolyamine being 1:1.0 to 1.2, and the heating being continued until the viscosity at 25° C. of a 50% aqueous solution of the resulting polyamidopolyamine reaches 400 to 1,000 cps, (ii) reacting the polyamidopolyamine with epichlorohydrin in an aqueous medium, the amount of epichlorohydrin being 1.6 to 1.7 moles per mole of the secondary amino group present in the polyamidopolyamine, the concentration of said reactants in the aqueous medium being 15 to 50% by weight, and the reaction being continued until the viscosity at 25° C. of a 15% aqueous solution of the reaction product reaches 30 to 150 cps, (iii) controlling the concentration of aqueous reaction product solution to 15 to 30% by weight, and (iv) adjusting the aqueous solution to pH 3 to 5 at 25° C.

2. The process according to claim 1, wherein the aliphatic dicarboxylic acid is malonic acid, succinic acid, glutaric acid, adipic acid or sebacic acid.

3. The process according to claim 1, wherein the polyalkylenepolyamine is diethylenetriamine, triethylenetetramine, tetraethylenepentamine or iminobispropylamine.

4. The process according to claim 1, wherein the heating in the step (i) is carried out in the presence of a catalytic amount of a sulfonic acid.

5. The process according to claim 4, wherein the sulfonic acid is sulfuric acid, benzenesulfonic acid or p-toluenesulfonic acid.

6. The process according to claim 1, wherein the heating in the step (i) is carried out at a temperature of 100° to 250° C.

7. The process according to claim 1, wherein the reaction in the step (ii) is carried out at a temperature of about 30° to about 80° C.

8. Wet-strength paper produced by the process of claim 1.

9. A process for producing wet-strength paper, which comprises applying to paper an aqueous solution of a thermosetting resin produced by a process consisting essentially of (i) heating an aliphatic dicarboxylic acid and a polyalkylenepolyamine to obtain a polyamidopolyamine, the molar ratio of the aliphatic dicarboxylic acid to the polyalkylenepolyamine being 1:1.0 to 1.2, and the heating being continued until the viscosity at 25° C. of a 50% aqueous solution of the resulting polyamidopolyamine reaches 400 to 1,000 cps, (ii) reacting the polyamidopolyamine with epichlorohydrin in an aqueous medium, the amount of epichlorohydrin being 1.6 to 1.7 moles per mole of the secondary amino group present in the polyamidopolyamine, the concentration of said reactants in the aqueous medium being 15 to 50% by weight, and the reaction being continued until the viscosity at 25° C. of a 15% aqueous solution of the reaction product reaches 30 to 150 cps, (iii) adjusting the aqueous solution to pH 3 to 5 at 25° C., and (iv) controlling the concentration of the aqueous reaction product solution to 15 to 30% by weight.

10. The process according to claim 9, wherein the aliphatic dicarboxylic acid is malonic acid, succinic acid, glutaric acid, adipic acid or sebacic acid.

11. The process according to claim 9, wherein the polyalkylenepolyamine is diethylenetriamine, triethylenetetramine, tetraethylenepentamine or iminobispropylamine.

12. The process according to claim 9, wherein the heating in the step (i) is carried out in the presence of a catalytic amount of a sulfonic acid.

13. The process according to claim 9, wherein the sulfonic acid is sulfuric acid, benzenesulfonic acid or p-toluenesulfonic acid.

14. The process according to claim 9, wherein the heating in the step (i) is carried out at a temperature of 100° to 250° C.

15. The process according to claim 9, wherein the reaction in the step (ii) is carried out at a temperature of about 30° to about 80° C.

16. Wet-strength paper produced by the process of claim 9.

* * * * *